(12) United States Patent
Gorobets et al.

(10) Patent No.: US 7,441,067 B2
(45) Date of Patent: *Oct. 21, 2008

(54) CYCLIC FLASH MEMORY WEAR LEVELING

(75) Inventors: Sergey A. Gorobets, Edinburgh (GB); Alan D. Bennett, Edinburgh (GB); Peter J. Smith, Eskbank (GB); Alan W. Sinclair, Candie (GB); Kevin M. Conley, San Jose, CA (US); Philip D. Royall, Longniddry (GB)

(73) Assignee: SanDisk Corporation, Milpitas, CA (US)

( * ) Notice: Subject to any disclaimer, the term of this patent is extended or adjusted under 35 U.S.C. 154(b) by 511 days.

This patent is subject to a terminal disclaimer.

(21) Appl. No.: 10/990,189

(22) Filed: Nov. 15, 2004

(65) Prior Publication Data

US 2006/0106972 A1     May 18, 2006

(51) Int. Cl.
G06F 12/00 (2006.01)
G11C 16/04 (2006.01)

(52) U.S. Cl. .............. 711/103; 365/185.33; 365/185.24

(58) Field of Classification Search .................. None
See application file for complete search history.

(56) References Cited

U.S. PATENT DOCUMENTS

| | | | |
|---|---|---|---|
| 5,043,940 A | 8/1991 | Harari | |
| 5,070,032 A | 12/1991 | Yuan et al. | |
| 5,095,344 A | 3/1992 | Harari | |
| 5,172,338 A | 12/1992 | Mehrotra et al. | |
| 5,268,870 A | 12/1993 | Harari | |
| 5,313,421 A | 5/1994 | Guterman et al. | |
| 5,315,541 A | 5/1994 | Harari et al. | |
| 5,341,339 A | 8/1994 | Wells | |
| 5,343,063 A | 8/1994 | Yuan et al. | |
| 5,388,083 A | 2/1995 | Assar et al. | |
| 5,479,633 A | 12/1995 | Wells et al. | |
| 5,479,638 A | 12/1995 | Assar et al. | |
| 5,485,595 A | 1/1996 | Assar et al. | |

(Continued)

FOREIGN PATENT DOCUMENTS

WO    WO2004/040459 A1    5/2004

(Continued)

OTHER PUBLICATIONS

ISA/EPO, "Invitation to Pay Additional Fees including Partial International Search Report," mailed in related Application No. PCT/US2006/001070 on Jun. 20, 2006, 7 pages.

(Continued)

Primary Examiner—Denise Tran
(74) Attorney, Agent, or Firm—Davis Wright Tremaine LLP

(57) ABSTRACT

A re-programmable non-volatile memory system, such as a flash EEPROM system, having its memory cells grouped into blocks of cells that are simultaneously erasable is operated in a manner to level out the wear of the individual blocks through repetitive erasing and re-programming. This may be accomplished without use of counts of the number of times the individual blocks experience erase and re-programming but such counts can optionally aid in carrying out the wear leveling process. Individual active physical blocks are chosen to be exchanged with those of an erased block pool in a predefined order.

1 Claim, 13 Drawing Sheets

U.S. PATENT DOCUMENTS

| | | | |
|---|---|---|---|
| 5,530,828 | A | 6/1996 | Kaki et al. |
| 5,532,962 | A | 7/1996 | Auclair et al. |
| 5,570,315 | A | 10/1996 | Tanaka et al. |
| 5,640,529 | A | 6/1997 | Hasbun |
| 5,644,539 | A | 7/1997 | Yamagami et al. |
| 5,661,053 | A | 8/1997 | Yuan |
| 5,774,397 | A | 6/1998 | Endoh et al. |
| 5,798,968 | A | 8/1998 | Lee et al. |
| 5,890,192 | A | 3/1999 | Lee et al. |
| 5,909,449 | A | 6/1999 | So et al. |
| 5,930,167 | A | 7/1999 | Lee et al. |
| 5,956,743 | A | 9/1999 | Bruce et al. |
| 6,000,006 | A | 12/1999 | Bruce et al. |
| 6,046,935 | A | 4/2000 | Takeuchi et al. |
| 6,222,762 | B1 | 4/2001 | Guterman et al. |
| 6,230,233 | B1 | 5/2001 | Lofgren et al. |
| 6,233,644 | B1 | 5/2001 | Dahlen et al. |
| 6,286,016 | B1 | 9/2001 | Heller et al. |
| 6,345,001 | B1 | 2/2002 | Mokhlesi |
| 6,373,746 | B1 | 4/2002 | Takeuchi et al. |
| 6,426,893 | B1 | 7/2002 | Conley et al. |
| 6,456,528 | B1 | 9/2002 | Chen |
| 6,522,580 | B2 | 2/2003 | Chen et al. |
| 6,732,221 | B2 | 5/2004 | Ban |
| 6,763,424 | B2 | 7/2004 | Conley |
| 6,771,536 | B2 | 8/2004 | Li et al. |
| 6,781,877 | B2 | 8/2004 | Cernea et al. |
| 7,012,835 | B2 | 3/2006 | Gonzalez et al. |
| 7,120,729 | B2 * | 10/2006 | Gonzalez et al. ............ 711/103 |
| 2002/0099904 | A1 | 7/2002 | Conley |
| 2002/0184432 | A1 | 12/2002 | Ban |
| 2003/0046487 | A1 | 3/2003 | Swaminathan |
| 2003/0109093 | A1 | 6/2003 | Harari et al. |
| 2003/0225961 | A1 | 12/2003 | Chow et al. |
| 2004/0083335 | A1 * | 4/2004 | Gonzalez et al. ............ 711/103 |
| 2004/0177212 | A1 | 9/2004 | Chang et al. |
| 2005/0073884 | A1 | 4/2005 | Gonzalez et al. |
| 2005/0144365 | A1 | 6/2005 | Gorobets et al. |
| 2005/0204187 | A1 | 9/2005 | Lee et al. |
| 2006/0053247 | A1 | 3/2006 | Cheung et al. |
| 2006/0161724 | A1 | 7/2006 | Bennett et al. |
| 2006/0161728 | A1 | 7/2006 | Bennett et al. |

FOREIGN PATENT DOCUMENTS

| | | |
|---|---|---|
| WO | WO2004040578 A2 | 5/2004 |
| WO | WO2004040585 A1 | 5/2004 |

OTHER PUBLICATIONS

"3.1: Objects, values and types." Python Library Reference. 2004, 2 pages, Dec. 19, 2006 http://web.archive.org/web/20040823015823/docs.python.org/ref/about.html.

Chang, "An Adaptive Striping Architecture for Flash Memory Storage Systems of Embedded Systems." Proceedings of the Eighth IEEE Real-Time and Embedded Technology and Applications Symposium, 2002, pp. 1-10.

Chiang, "Managing Flash Memory in Personal Communication Devices." IEEE, 1997, pp. 177-182.

Chiang, "Cleaning Policies in Mobile Computers using Flash Memory," Journal of Systems and Software. Elsevier Science, 1999, pp. 213-231.

Kalinsky, David, "Introduction to Priority Inversions." Embedded Systems Programming. Apr. 2002, pp. 55-56. http://www.netrino.com/Publications/Glossary/Priority/Inversion.html.

Park, "Cost-Efficient Memory Architecture Design of NAND Flash Memory Embedded Systems." Proceedings of the 21$^{st}$ International Conference on Computer Design, 2003, pp. 1-6.

* cited by examiner

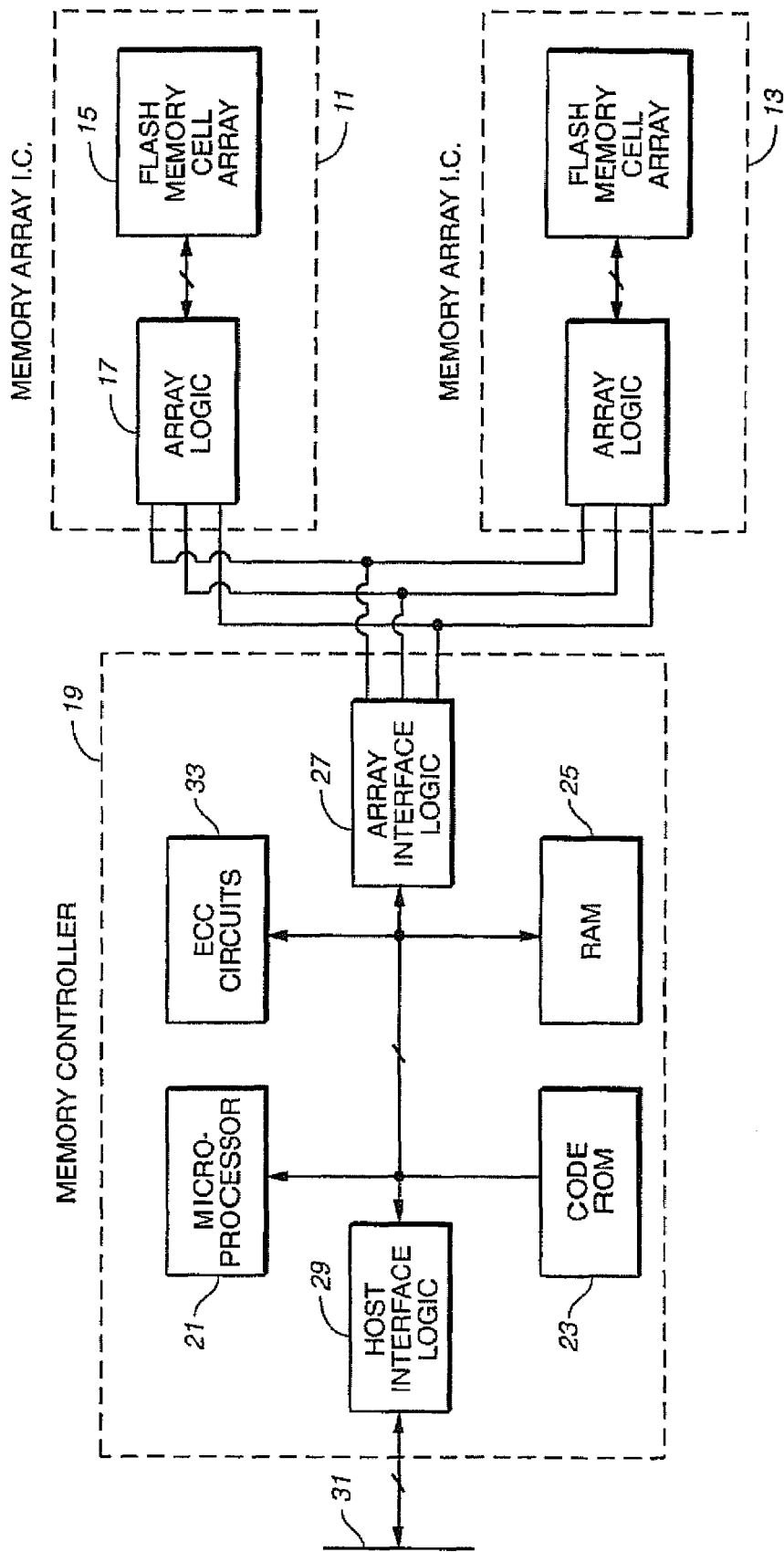
FIG._1A

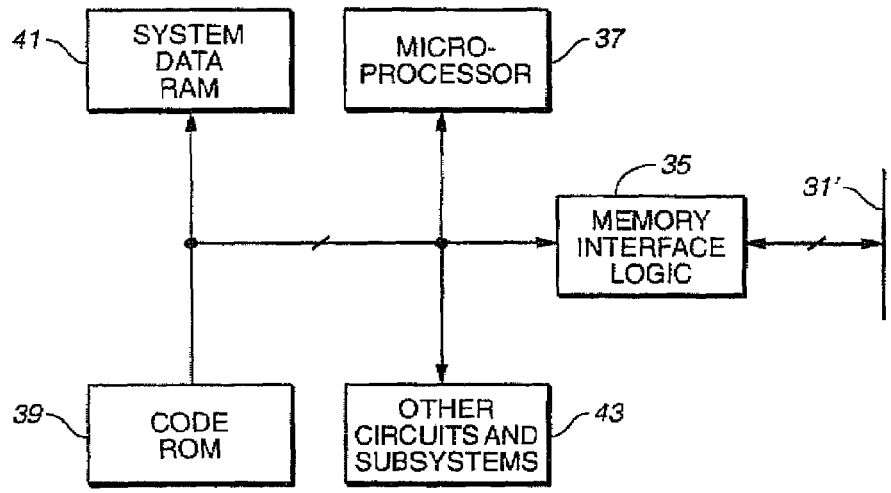
FIG._1B
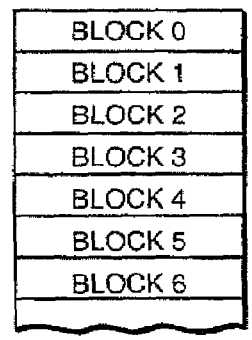
FIG._2
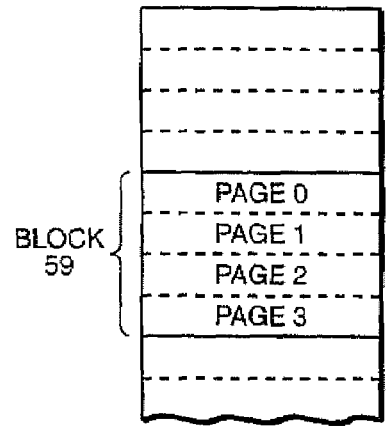
FIG._4
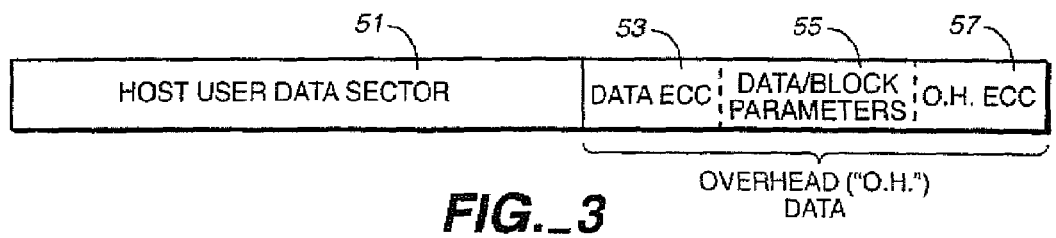
FIG._3

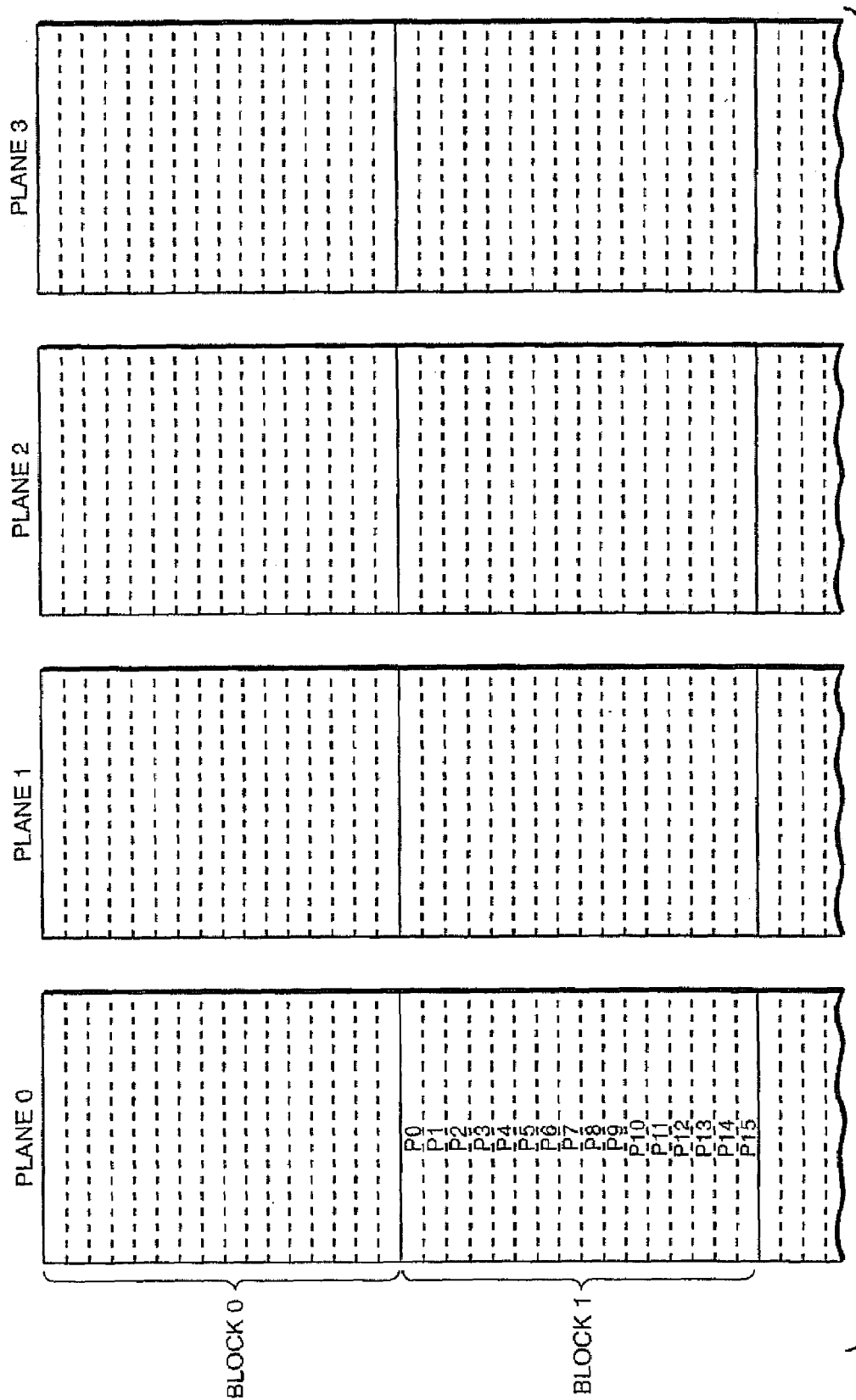
FIG._5

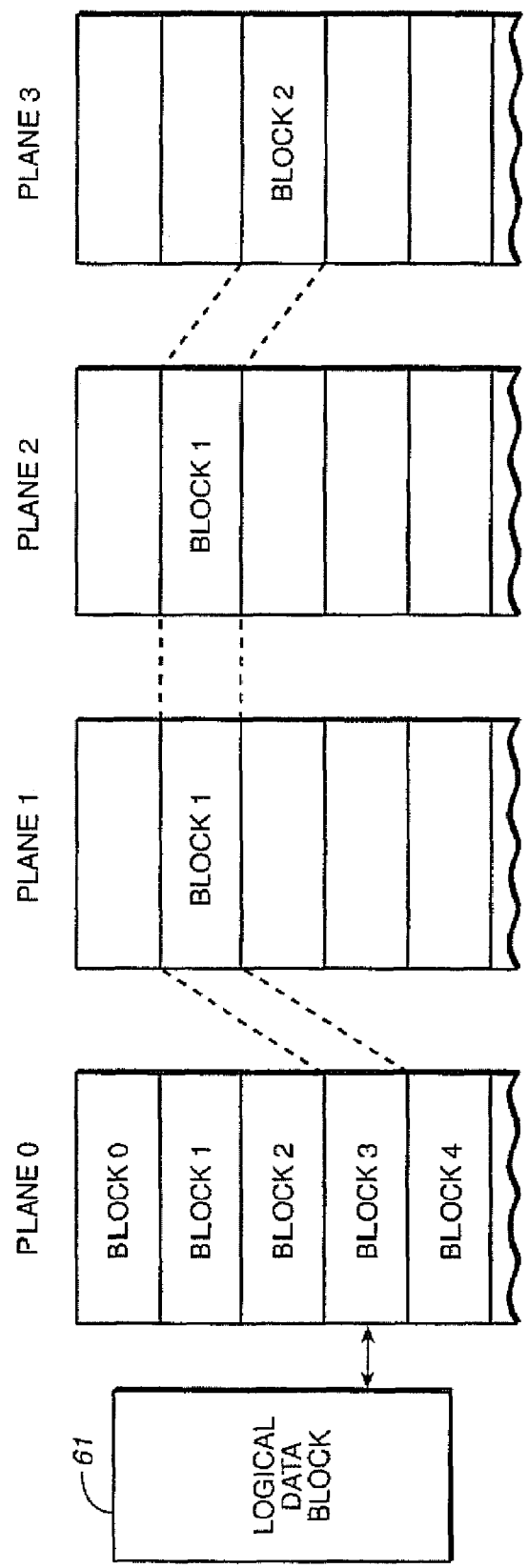
FIG._6

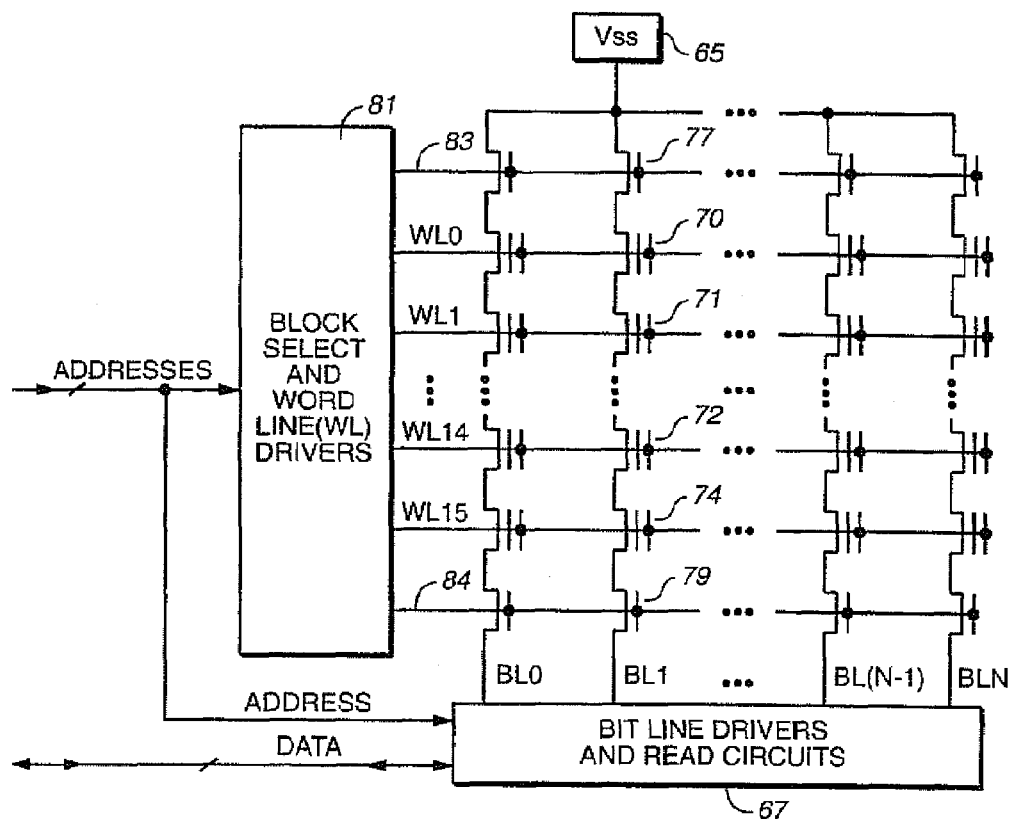
FIG._7

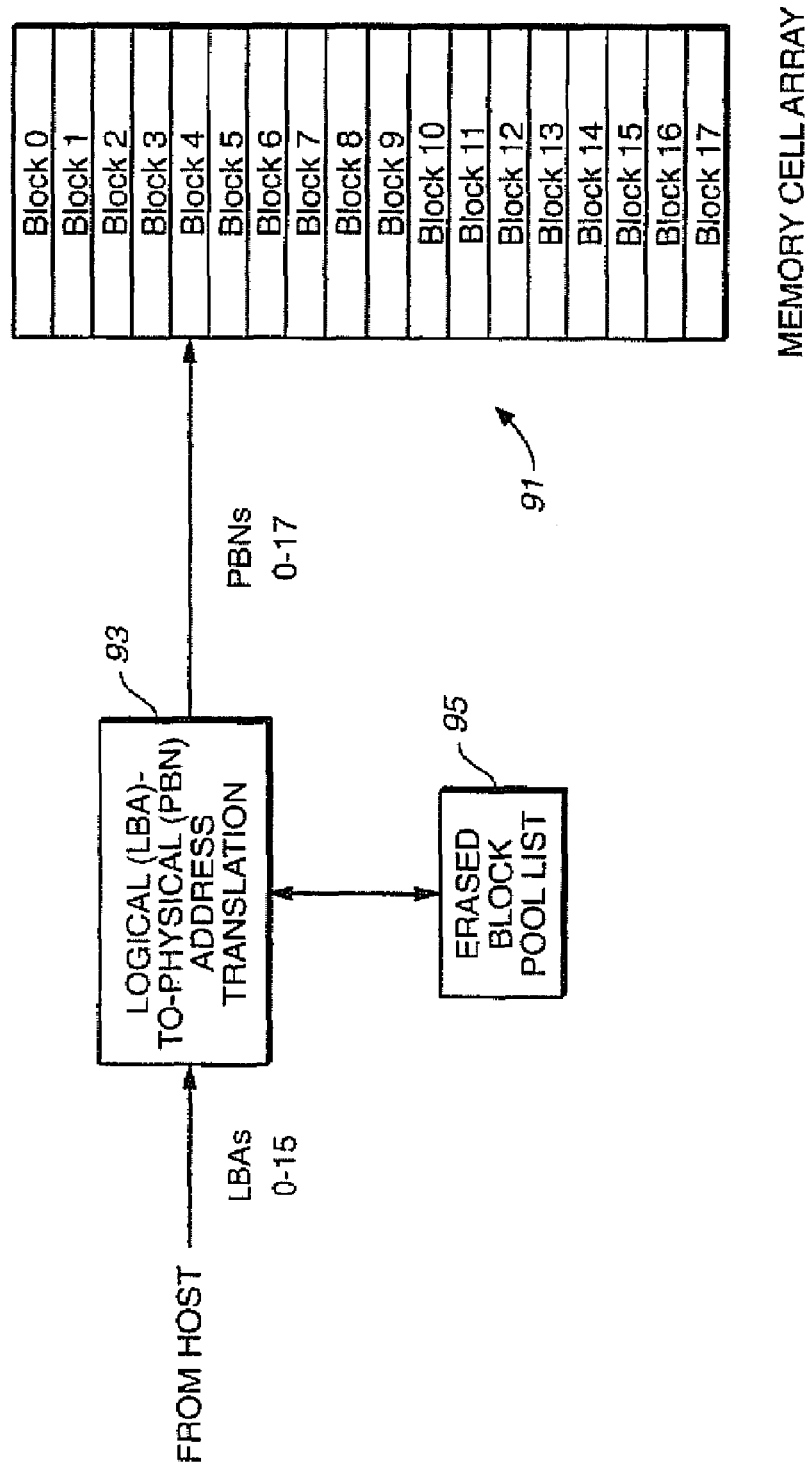
FIG._8

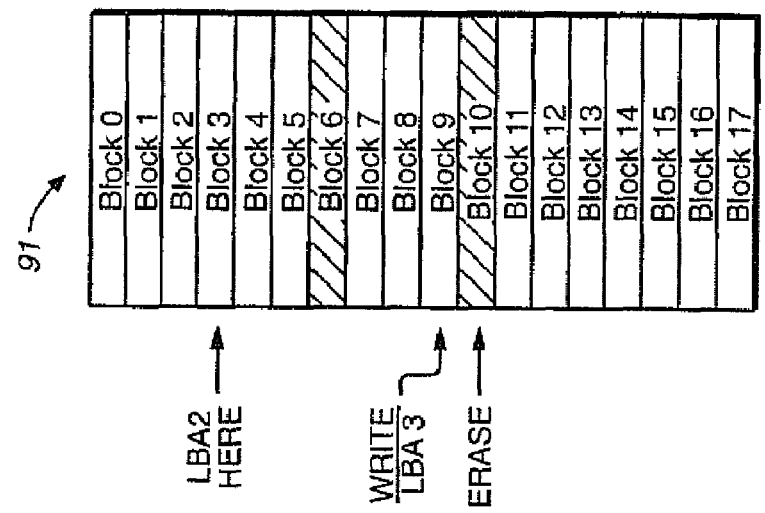
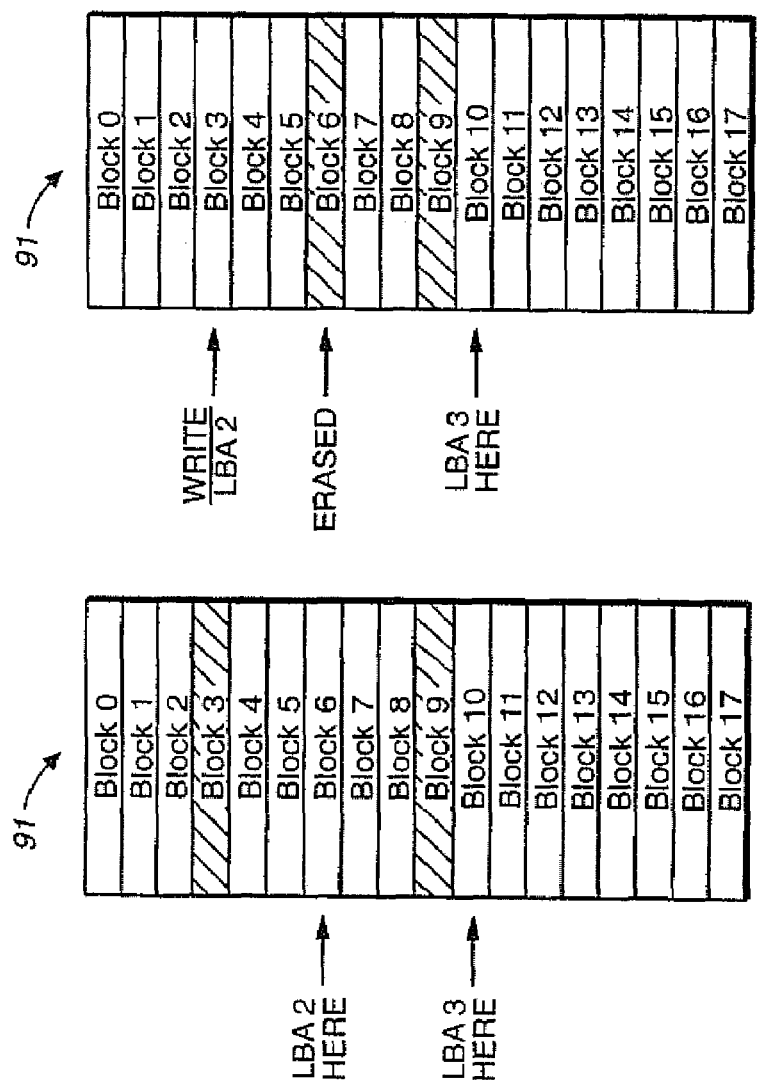

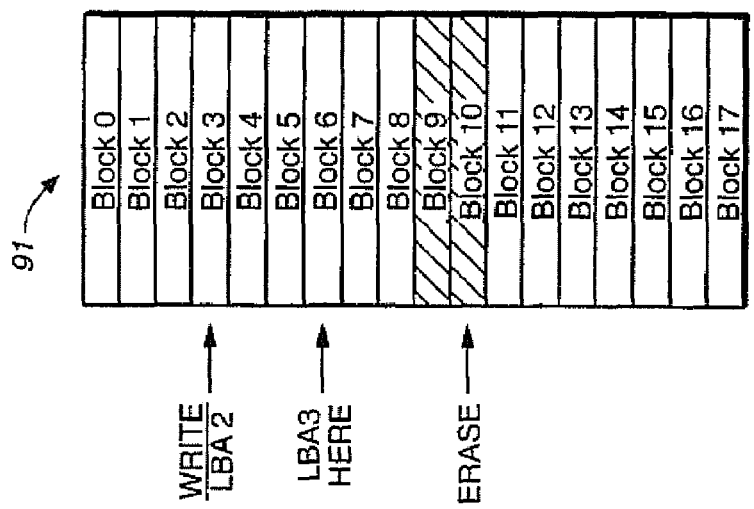
FIG._9F
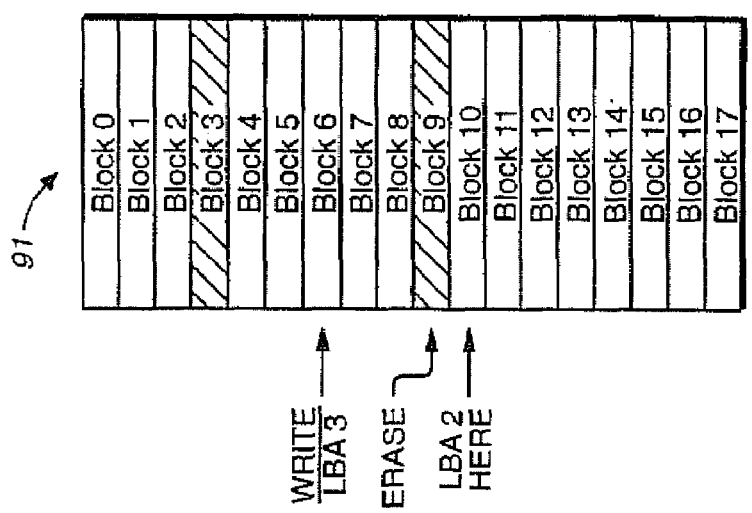
FIG._9E
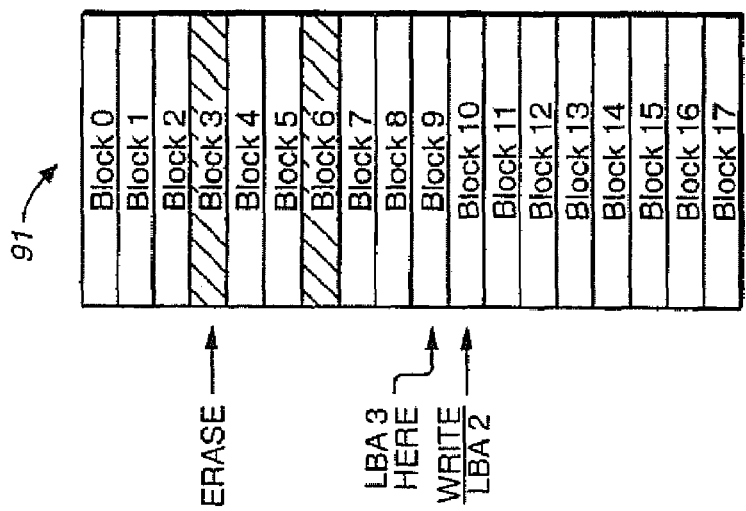
FIG._9D

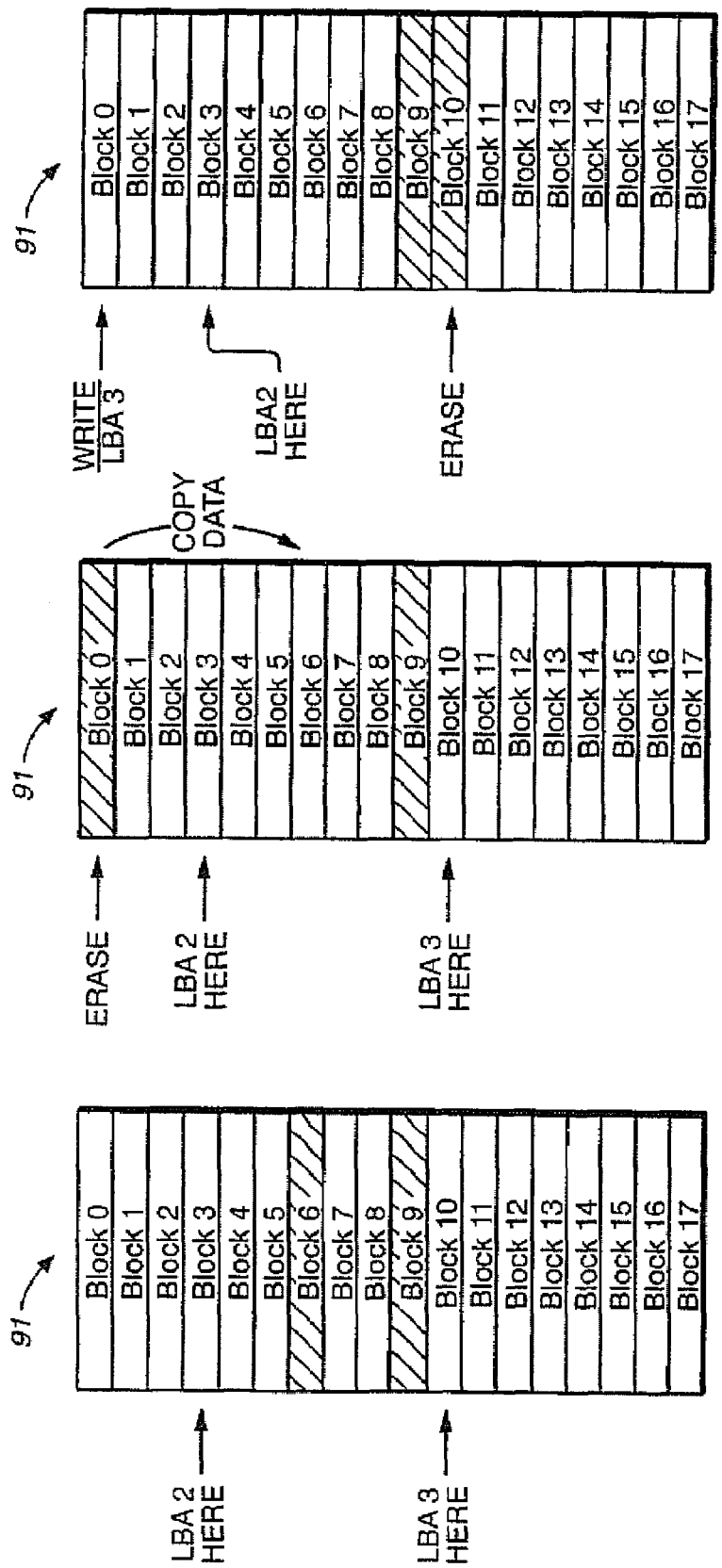

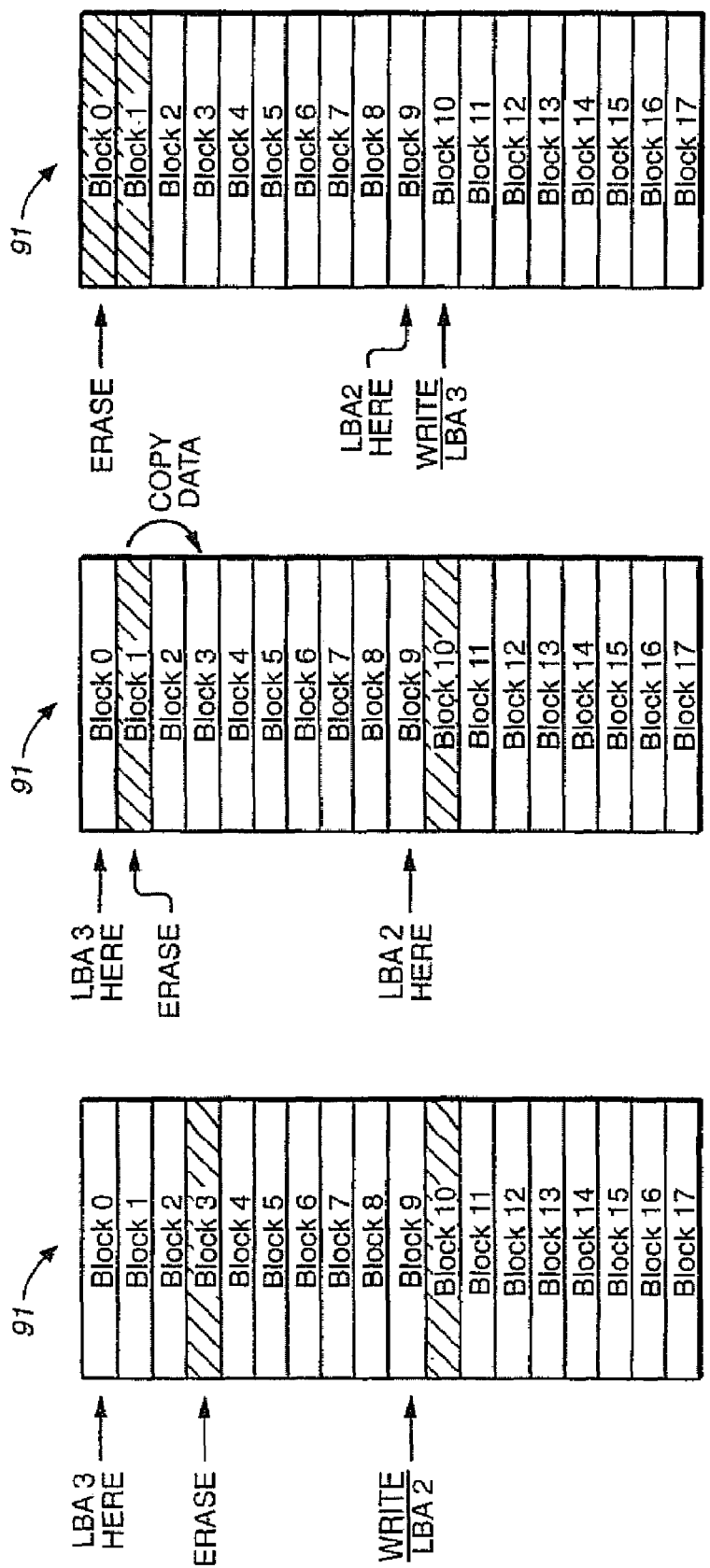

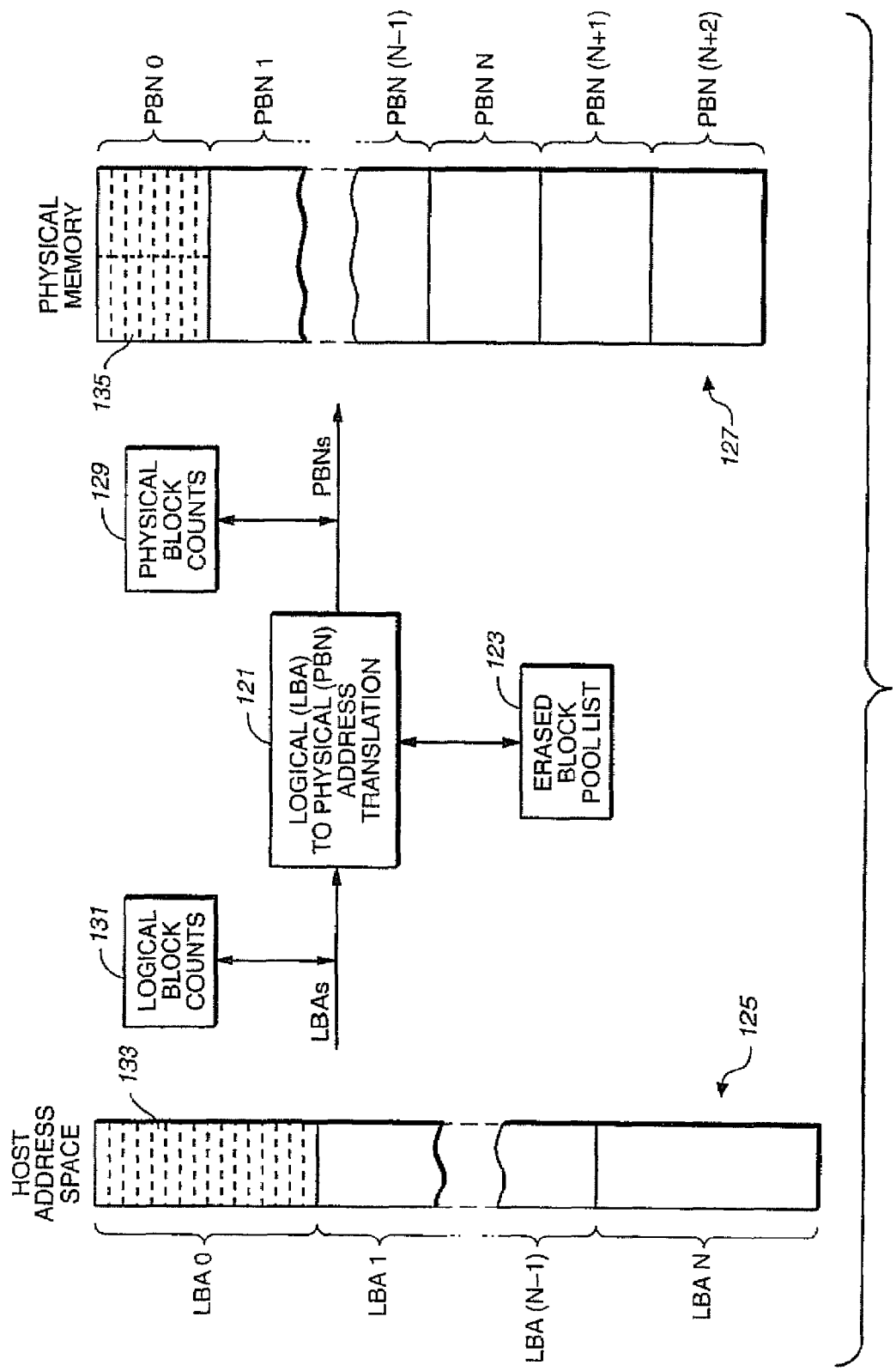
FIG._11

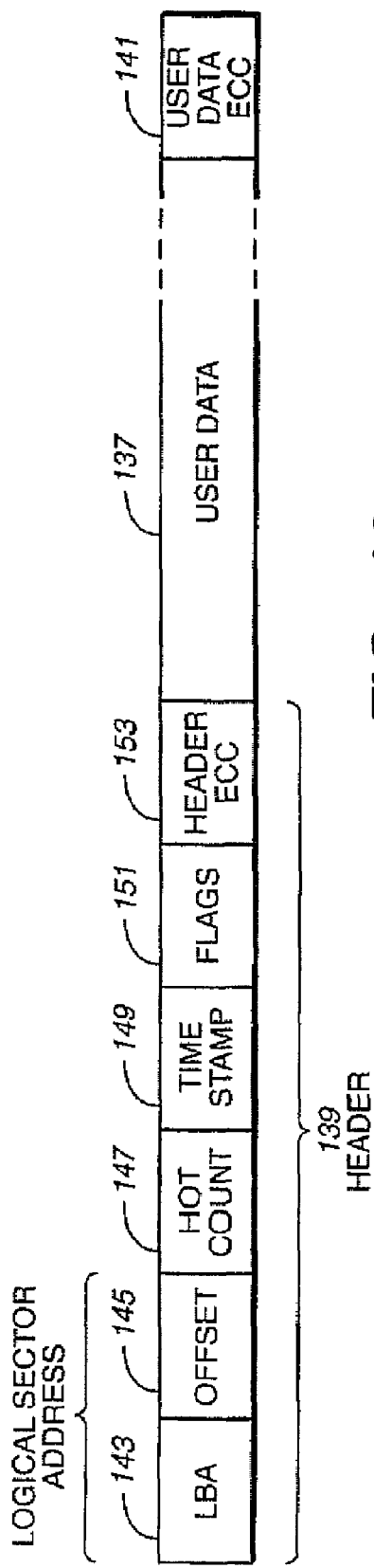
FIG._12
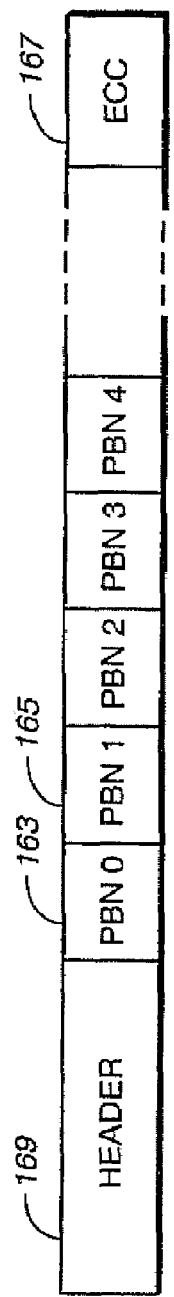
FIG._13

CYCLIC FLASH MEMORY WEAR LEVELING

BACKGROUND AND SUMMARY OF RELATED PATENTS AND APPLICATIONS

This invention relates generally to the operation of non-volatile flash memory systems, and, more specifically, to techniques of even usage among different blocks or other portions of the memory, particularly in memory systems having large memory cell blocks.

There are many commercially successful non-volatile memory products being used today, particularly in the form of small form factor cards, which employ an array of flash EEPROM (Electrically Erasable and Programmable Read Only Memory) cells formed on one or more integrated circuit chips. A memory controller, usually but not necessarily on a separate integrated circuit chip, interfaces with a host to which the card is removably connected and controls operation of the memory array within the card. Such a controller typically includes a microprocessor, some non-volatile read-only-memory (ROM), a volatile random-access-memory (RAM) and one or more special circuits such as one that calculates an error-correction-code (ECC) from data as they pass through the controller during the programming and reading of data. Some of the commercially available cards are CompactFlash™ (CF) cards, MultiMedia cards (MMC), Secure Digital (SD) cards, SmartMedia cards, miniSD cards, TransFlash cards, Memory Stick and Memory Stick Duo cards, all of which are available from SanDisk Corporation, assignee hereof. Each of these cards has a particular mechanical and electrical interface with host devices to which it is removably connected. Another class of small, hand-held flash memory devices includes flash drives that interface with a host through a standard Universal Serial Bus (USB) connector. SanDisk Corporation provides such devices under its Cruzer trademark. Hosts include personal computers, notebook computers, personal digital assistants (PDAs), various data communication devices, digital cameras, cellular telephones, portable audio players, automobile sound systems, and similar types of equipment. Besides the memory card implementation, this type of memory can alternatively be embedded into various types of host systems.

Two general memory cell array architectures have found commercial application, NOR and NAND. In a typical NOR array, memory cells are connected between adjacent bit line source and drain diffusions that extend in a column direction with control gates connected to word lines extending along rows of cells. A memory cell includes at least one storage element positioned over at least a portion of the cell channel region between the source and drain. A programmed level of charge on the storage elements thus controls an operating characteristic of the cells, which can then be read by applying appropriate voltages to the addressed memory cells. Examples of such cells, their uses in memory systems and methods of manufacturing them are given in U.S. Pat. Nos. 5,070,032, 5,095,344, 5,313,421, 5,315,541, 5,343,063, 5,661,053 and 6,222,762.

The NAND array utilizes series strings of more than two memory cells, such as 16 or 32, connected along with one or more select transistors between individual bit lines and a reference potential to form columns of cells. Word lines extend across cells within a large number of these columns. An individual cell within a column is read and verified during programming by causing the remaining cells in the string to be turned on hard so that the current flowing through a string is dependent upon the level of charge stored in the addressed cell. Examples of NAND architecture arrays and their operation as part of a memory system are found in U.S. Pat. Nos. 5,570,315, 5,774,397, 6,046,935, 6,373,746, 6,456,528, 6,522,580, 6,771,536 and 6,781,877.

The charge storage elements of current flash EEPROM arrays, as discussed in the foregoing referenced patents, are most commonly electrically conductive floating gates, typically formed from conductively doped polysilicon material. An alternate type of memory cell useful in flash EEPROM systems utilizes a non-conductive dielectric material in place of the conductive floating gate to store charge in a non-volatile manner. A triple layer dielectric formed of silicon oxide, silicon nitride and silicon oxide (ONO) is sandwiched between a conductive control gate and a surface of a semi-conductive substrate above the memory cell channel. The cell is programmed by injecting electrons from the cell channel into the nitride, where they are trapped and stored in a limited region, and erased by injecting hot holes into the nitride. Several specific cell structures and arrays employing dielectric storage elements and are described in United States patent application publication no. US 2003/0109093 of Harari et al.

As in most all integrated circuit applications, the pressure to shrink the silicon substrate area required to implement some integrated circuit function also exists with flash EEPROM memory cell arrays. It is continually desired to increase the amount of bdigital data that can be stored in a given area of a silicon substrate, in order to increase the storage capacity of a given size memory card and other types of packages, or to both increase capacity and decrease size. One way to increase the storage density of data is to store more than one bit of data per memory cell and/or per storage unit or element. This is accomplished by dividing a window of a storage element charge level voltage range into more than two states. The use of four such states allows each cell to store two bits of data, eight states stores three bits of data per storage element, and so on. Multiple state flash EEPROM structures using floating gates and their operation are described in U.S. Pat. Nos. 5,043,940 and 5,172,338, and for structures using dielectric floating gates in aforementioned United States patent application publication no. US 2003/0109093. Selected portions of a multi-state memory cell array may also be operated in two states (binary) for various reasons, in a manner described in U.S. Pat. Nos. 5,930,167 and 6,456,528.

Memory cells of a typical flash EEPROM array are divided into discrete blocks of cells that are erased together. That is, the block is the erase unit, a minimum number of cells that are simultaneously erasable. Each block typically stores one or more pages of data, the page being the minimum unit of programming and reading, although more than one page may be programmed or read in parallel in different sub-arrays or planes. Each page typically stores one or more sectors of data, the size of the sector being defined by the host system. An example sector includes 512 bytes of user data, following a standard established with magnetic disk drives, plus some number of bytes of overhead information about the user data and/or the block in which they are stored. Such memories are typically configured with 16, 32 or more pages within each block, and each page stores one or just a few host sectors of data.

In order to increase the degree of parallelism during programming user data into the memory array and read user data from it, the array is typically divided into sub-arrays, commonly referred to as planes, which contain their own data registers and other circuits to allow parallel operation such that sectors of data may be programmed to or read from each of several or all the planes simultaneously. An array on a single integrated circuit may be physically divided into planes, or each plane may be formed from a separate one or more integrated circuit chips. Examples of such a memory implementation are described in U.S. Pat. Nos. 5,798,968 and 5,890,192.

To further efficiently manage the memory, blocks may be linked together to form virtual blocks or metablocks. That is, each metablock is defined to include one block from each plane. Use of the metablock is described in U.S. Pat. No. 6,763,424. The metablock is identified by a host logical block address as a destination for programming and reading data. Similarly, all blocks of a metablock are erased together. The controller in a memory system operated with such large blocks and/or metablocks performs a number of functions including the translation between logical block addresses (LBAs) received from a host, and physical block numbers (PBNs) within the memory cell array. Individual pages within the blocks are typically identified by offsets within the block address. Address translation often involves use of intermediate terms of a logical block number (LBN) and logical page.

Data stored in a metablock are often updated, the likelihood of updates as the data capacity of the metablock increases. Updated sectors of one metablock are normally written to another metablock. The unchanged sectors are usually also copied from the original to the new metablock, as part of the same programming operation, to consolidate the data. Alternatively, the unchanged data may remain in the original metablock until later consolidation with the updated data into a single metablock again.

It is common to operate large block or metablock systems with some extra blocks maintained in an erased block pool. When one or more pages of data less than the capacity of a block are being updated, it is typical to write the updated pages to an erased block from the pool and then copy data of the unchanged pages from the original block to erase pool block. Variations of this technique are described in aforementioned U.S. Pat. No. 6,763,424. Over time, as a result of host data files being re-written and updated, many blocks can end up with a relatively few number of its pages containing valid data and remaining pages containing data that is no longer current. In order to be able to efficiently use the data storage capacity of the array, logically related data pages of valid data are from time-to-time gathered together from fragments among multiple blocks and consolidated together into a fewer number of blocks. This process is commonly termed "garbage collection."

In some memory systems, the physical memory cells are also grouped into two or more zones. A zone may be any partitioned subset of the physical memory or memory system into which a specified range of logical block addresses is mapped. For example, a memory system capable of storing 64 Megabytes of data may be partitioned into four zones that store 16 Megabytes of data per zone. The range of logical block addresses is then also divided into four groups, one group being assigned to the physical blocks of each of the four zones. Logical block addresses are constrained, in a typical implementation, such that the data of each are never written outside of a single physical zone into which the logical block addresses are mapped. In a memory cell array divided into planes (sub-arrays), which each have their own addressing, programming and reading circuits, each zone preferably includes blocks from multiple planes, typically the same number of blocks from each of the planes. Zones are primarily used to simplify address management such as logical to physical translation, resulting in smaller translation tables, less RAM memory needed to hold these tables, and faster access times to address the currently active region of memory, but because of their restrictive nature can result in less than optimum wear leveling.

Individual flash EEPROM cells store an amount of charge in a charge storage element or unit that is representative of one or more bits of data. The charge level of a storage element controls the threshold voltage (commonly referenced as $V_T$) of its memory cell, which is used as a basis of reading the storage state of the cell. A threshold voltage window is commonly divided into a number of ranges, one for each of the two or more storage states of the memory cell. These ranges are separated by guardbands that include a nominal sensing level that allows determining the storage states of the individual cells. These storage levels do shift as a result of charge disturbing programming, reading or erasing operations performed in neighboring or other related memory cells, pages or blocks. Error correcting codes (ECCs) are therefore typically calculated by the controller and stored along with the host data being programmed and used during reading to verify the data and perform some level of data correction if necessary. Also, shifting charge levels can be restored back to the centers of their state ranges from time-to-time, before disturbing operations cause them to shift completely out of their defined ranges and thus cause erroneous data to be read. This process, termed data refresh or scrub, is described in U.S. Pat. Nos. 5,532,962 and 5,909,449, and 7,012,835.

The responsiveness of flash memory cells typically changes over time as a function of the number of times the cells are erased and re-programmed. This is thought to be the result of small amounts of charge being trapped in a storage element dielectric layer during each erase and/or re-programming operation, which accumulates over time. This generally results in the memory cells becoming less reliable, and may require higher voltages for erasing and programming as the memory cells age. The effective threshold voltage window over which the memory states may be programmed can also decrease as a result of the charge retention. This is described, for example, in U.S. Pat. No. 5,268,870. The result is a limited effective lifetime of the memory cells; that is, memory cell blocks are subjected to only a preset number of erasing and re-programming cycles before they are mapped out of the system. The number of cycles to which a flash memory block is desirably subjected depends upon the particular structure of the memory cells, the amount of the threshold window that is used for the storage states, the extent of the threshold window usually increasing as the number of storage states of each cell is increased. Depending upon these and other factors, the number of lifetime cycles can be as low as 10,000 and as high as 100,000 or even several hundred thousand.

In order to keep track of the number of cycles experienced by the memory cells of the individual blocks, a count can be kept for each block, or for each of a group of blocks, that is incremented each time the block is erased, as described in aforementioned U.S. Pat. No. 5,268,870. This count may be stored in each block, as there described, or in a separate block along with other overhead information, as described in U.S. Pat. No. 6,426,893. In addition to its use for mapping a block out of the system when it reaches a maximum lifetime cycle count, the count can be earlier used to control erase and programming parameters as the memory cell blocks age. And rather than keeping an exact count of the number of cycles, U.S. Pat. No. 6,345,001 describes a technique of updating a compressed count of the number of cycles when a random or pseudo-random event occurs.

The cycle count can also be used to even out the usage of the memory cell blocks of a system before they reach their end of life. Several different wear leveling techniques are described in U.S. Pat. No. 6,230,233, and 7,120,729 and in the following U.S. patent nos. 6,985,992, 7,035,967, 6,973,531 and 7,096,313. The primary advantage of wear leveling is to prevent some blocks from reaching their maximum cycle count, and thereby having to be mapped out of the system, while other blocks have barely been used. By spreading the number of cycles reasonably evenly over all the blocks of the system, the full capacity of the memory can be maintained for an extended period with good performance characteristics.

In another approach to wear leveling, boundaries between physical zones of blocks are gradually migrated across the memory cell array by incrementing the logical-to-physical block address translations by one or a few blocks at a time. This is described in U.S. patent 7,120,729.

A principal cause of a few blocks of memory cells being subjected to a much larger number of erase and re-programming cycles than others of the memory system is the host's continual re-writing of data sectors in a relatively few logical block addresses. This occurs in many applications of the memory system where the host continually updates certain sectors of housekeeping data stored in the memory, such as file allocation tables (FATs) and the like. Specific uses of the host can also cause a few logical blocks to be re-written much more frequently than others with user data. In response to receiving a command from the host to write data to a specified logical block address, the data are written to one of a few blocks of a pool of erased blocks. That is, instead of re-writing the data in the same physical block where the original data of the same logical block address resides, the logical block address is remapped into a block of the erased block pool. The block containing the original and now invalid data is then erased either immediately or as part of a later garbage collection operation, and then placed into the erased block pool. The result, when data in only a few logical block addresses are being updated much more than other blocks, is that a relatively few physical blocks of the system are cycled with the higher rate. It is of course desirable to provide the capability within the memory system to even out the wear on the physical blocks when encountering such grossly uneven logical block access, for the reasons given above.

SUMMARY OF THE INVENTION

It is also desirable to be able to provide such wear leveling without the necessity of maintaining counts or other indications of the numbers of times that the individual physical blocks are cycled, since this utilizes additional hardware and operational overhead that can affect the overall performance of the system. Therefore, according to a principal aspect of the present invention, the physical blocks of the memory are exchanged with blocks of the erased block pool, one or a few at a time, in sequence, without the need to maintain physical block erase cycle counts. That is, a cyclic incrementing relocation pointer can be scanned through the physical block addresses to select one or a few blocks at a time to be exchanged with the same number of erased pool blocks. Such an exchange is desirably performed at intervals between which a certain number of a particular memory operation have occurred, such as every certain number of programming operations directed to physical blocks within the erased block pool. Physical blocks that experience low usage are by this technique reallocated into the erased block pool where they are subjected to additional usage in place of the heavily used erased pool blocks. In effect, the erased pool blocks are caused to migrate throughout the physical space of the entire memory system or a defined portion of it such as a plane or a zone.

Alternatively, instead scanning through the physical block addresses to select one or a few blocks at a time to be exchanged, logical block addresses may be scanned instead. When one or more logical blocks have been selected in this way, the corresponding physical blocks are identified by accessing the logical-to-physical address table maintained by the memory controller. The identified one or more physical blocks are then exchanged with an equal number of blocks from the erase pool, in the manner summarized above.

According to another aspect of the present invention, experience counts or indications of the usage of individual blocks or groups of blocks may be employed in conjunction with the foregoing to enhance the wear leveling process. This can be worthwhile particularly if the capability of maintaining these counts or indications are being provided in the memory system for other reasons anyway. For example, instead of incrementing through the individual physical blocks in order to designate a block for a wear leveling exchange with an erased pool block, the experience counts of a number of physical blocks within a range of physical block addresses may be examined at one time to select only one or a few of those blocks with the lowest counts to be exchanged while the others of the group are not exchanged. In another example of the use of physical block experience counts, rather than automatically initiating a wear leveling exchange at an interval of a given number of programming operations, such a scheduled exchange can be skipped when the experience counts of one to all of the erased pool blocks do not exceed an average count of all the physical blocks by a predefined amount. Further, logical block experience counts may be maintained by the memory system controller to identify physical blocks with a low number of experience counts as those storing data of logical blocks having low counts. Conversely, logical blocks with high counts provide an indication of likely continued heavy cycling of its data. These logical block counts can also be used to limit initiation of scheduled wear leveling exchanges between one physical block and another of the erase pool when such an exchange is unnecessary to even wear between the blocks. Such limits on the initiation of wear leveling exchanges are particularly advantageous during early stages of a memory system operation when the wear is relatively level and such exchanges are then usually unnecessary.

Additional aspects, advantages and features of the scrubbing system herein are included in the following description of exemplary examples thereof, which description should be taken in conjunction with the accompanying drawings. All patents, patent applications, articles and other publications referenced herein are hereby incorporated herein by those references in their entirety for all purposes.

BRIEF DESCRIPTION OF THE DRAWINGS

FIGS. 1A and 1B are block diagrams of a non-volatile memory and a host system, respectively, that operate together;

FIG. 2 illustrates a first example organization of the memory array of FIG. 1A;

FIG. 3 shows an example host data sector with overhead data as stored in the memory array of FIG. 1A;

FIG. 4 illustrates a second example organization of the memory array of FIG. 1A;

FIG. 5 illustrates a third example organization of the memory array of FIG. 1A;

FIG. 6 shows an extension of the third example organization of the memory array of FIG. 1A;

FIG. 7 is a circuit diagram of a group of memory cells of the array of FIG. 1A in one particular configuration;

FIG. 8 conceptually illustrates a first simplified example of addressing the memory array of FIG. 1A during programming;

FIGS. 9A-9F provide an example of several programming operations in sequence without wear leveling;

FIGS. 10A-10F show some of the programming sequence of FIGS. 9A-9F with wear leveling;

FIG. 11 conceptually illustrates a second simplified example of addressing the memory array of Figure 1A during programming;

FIG. 12 shows fields of user and overhead data of an example data sector that is stored in the memory;

FIG. 13 illustrates a data sector storing physical block erase cycle counts.

DESCRIPTION OF EXEMPLARY EMBODIMENTS

Memory Architectures and Their Operation

Figure 14:
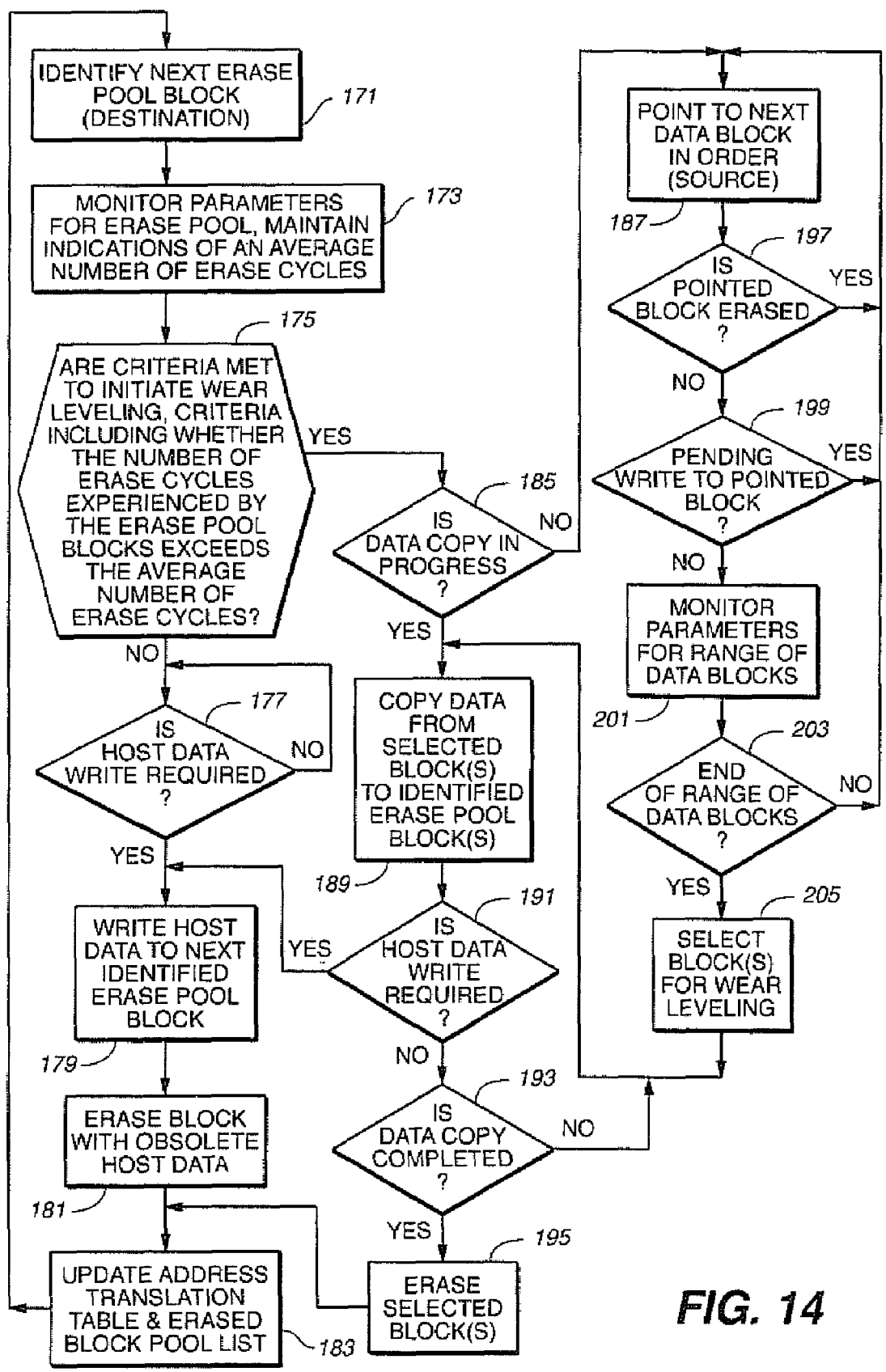
FIG. 14 is a flow chart showing an example wear leveling sequence.

Referring initially to FIG. 1A, a flash memory includes a memory cell array and a controller. In the example shown, two integrated circuit devices (chips) 11 and 13 include an array 15 of memory cells and various logic circuits 17. The logic circuits 17 interface with a controller 19 on a separate chip through data, command and status circuits, and also provide addressing, data transfer and sensing, and other support to the array 13. A number of memory array chips can be from one to many, depending upon the storage capacity provided. The controller and part or the entire array can alternatively be combined onto a single integrated circuit chip but this is currently not an economical alternative.

A typical controller 19 includes a microprocessor 21, a read-only-memory (ROM) 23 primarily to store firmware and a buffer memory (RAM) 25 primarily for the temporary storage of user data either being written to or read from the memory chips 11 and 13. Circuits 27 interface with the memory array chip(s) and circuits 29 interface with a host though connections 31. The integrity of data is in this example determined by calculating an ECC with circuits 33 dedicated to calculating the code. As user data is being transferred from the host to the flash memory array for storage, the circuit calculates an ECC from the data and the code is stored in the memory. When that user data are later read from the memory, they are again passed through the circuit 33 which calculates the ECC by the same algorithm and compares that code with the one calculated and stored with the data. If they compare, the integrity of the data is confirmed. If they differ, depending upon the specific ECC algorithm utilized, those bits in error, up to a number supported by the algorithm, can be identified and corrected.

The connections 31 of the memory of FIG. 1A mate with connections 31' of a host system, an example of which is given in Figure 1B. Data transfers between the host and the memory of FIG. 1A are through interface circuits 35. A typical host also includes a microprocessor 37, a ROM 39 for storing firmware code and RAM 41. Other circuits and subsystems 43 often include a high capacity magnetic data storage disk drive, interface circuits for a keyboard, a monitor and the like, depending upon the particular host system. Some examples of such hosts include desktop computers, laptop computers, handheld computers, palmtop computers, personal digital assistants (PDAs), MP3 and other audio players, digital cameras, video cameras, electronic game machines, wireless and wired telephony devices, answering machines, voice recorders, network routers and others.

The memory of FIG. 1A may be implemented as a small enclosed memory card or flash drive containing the controller and all its memory array circuit devices in a form that is removably connectable with the host of FIG. 1B. That is, mating connections 31 and 31' allow a card to be disconnected and moved to another host, or replaced by connecting another card to the host. Alternatively, the memory array devices may be enclosed in a separate card that is electrically and mechanically connectable with a card containing the controller and connections 31. As a further alternative, the memory of FIG. 1A may be embedded within the host of FIG. 1B, wherein the connections 31 and 31' are permanently made. In this case, the memory is usually contained within an enclosure of the host along with other components.

The wear leveling techniques herein may be implemented in systems having various specific configurations, examples of which are given in FIGS. 2-6. FIG. 2 illustrates a portion of a memory array wherein memory cells are grouped into blocks, the cells in each block being erasable together as part of a single erase operation, usually simultaneously. A block is the minimum unit of erase.

The size of the individual memory cell blocks of FIG. 2 can vary but one commercially practiced form includes a single sector of data in an individual block. The contents of such a data sector are illustrated in FIG. 3. User data 51 are typically 512 bytes. In addition to the user data 51 are overhead data that includes an ECC 53 calculated from the user data, parameters 55 relating to the sector data and/or the block in which the sector is programmed and an ECC 57 calculated from the parameters 55 and any other overhead data that might be included.

The parameters 55 may include a quantity related to the number of program/erase cycles experienced by the block, this quantity being updated after each cycle or some number of cycles. When this experience quantity is used in a wear leveling algorithm, logical block addresses are regularly re-mapped to different physical block addresses in order to even out the usage (wear) of all the blocks. Another use of the experience quantity is to change voltages and other parameters of programming, reading and/or erasing as a function of the number of cycles experienced by different blocks.

The parameters 55 may also include an indication of the bit values assigned to each of the storage states of the memory cells, referred to as their "rotation". This also has a beneficial effect in wear leveling. One or more flags may also be included in the parameters 55 that indicate status or states. Indications of voltage levels to be used for programming and/or erasing the block can also be stored within the parameters 55, these voltages being updated as the number of cycles experienced by the block and other factors change. Other examples of the parameters 55 include an identification of any defective cells within the block, the logical address of the block that is mapped into this physical block and the address of any substitute block in case the primary block is defective. The particular combination of parameters 55 that are used in any memory system will vary in accordance with the design. Also, some or all of the overhead data can be stored in blocks dedicated to such a function, rather than in the block containing the user data or to which the overhead data pertains.

Different from the single data sector block of FIG. 2 is a multi-sector block of FIG. 4. An example block 59, still the minimum unit of erase, contains four pages 0-3, each of which is the minimum unit of programming. One or more host sectors of data are stored in each page, usually along with overhead data including at least the ECC calculated from the sector's data and may be in the form of the data sector of FIG. 3.

Re-writing the data of an entire block usually involves programming the new data into an erased block of an erase block pool, the original block then being erased and placed in the erase pool. When data of less than all the pages of a block are updated, the updated data are typically stored in a page of an erased block from the erased block pool and data in the remaining unchanged pages are copied from the original block into the new block. The original block is then erased. Variations of this large block management technique include writing the updated data into a page of another block without moving data from the original block or erasing it. This results in multiple pages having the same logical address. The most recent page of data is identified by some convenient technique such as the time of programming that is recorded as a field in sector or page overhead data.

A further multi-sector block arrangement is illustrated in FIG. 5. Here, the total memory cell array is physically divided into two or more planes, four planes 0-3 being illustrated. Each plane is a sub-array of memory cells that has its own data registers, sense amplifiers, addressing decoders and the like in order to be able to operate largely independently of the other planes. All the planes may be provided on a single integrated circuit device or on multiple devices. Each block in the example system of FIG. 5 contains 16 pages P0-P15, each page having a capacity of one, two or more host data sectors and some overhead data.

Yet another memory cell arrangement is illustrated in FIG. 6. Each plane contains a large number of blocks of cells. In order to increase the degree of parallelism of operation, blocks within different planes are logically linked to form metablocks. One such metablock is illustrated in FIG. 6 as being formed of block 3 of plane 0, block 1 of plane 1, block 1 of plane 2 and block 2 of plane 3. Each metablock is logically addressable and the memory controller assigns and keeps track of the blocks that form the individual metablocks. The host system preferably interfaces with the memory system in units of data equal to the capacity of the individual metablocks. Such a logical data block 61 of FIG. 6, for example, is identified by a logical block addresses (LBA) that is mapped by the controller into the physical block numbers (PBNs) of the blocks that make up the metablock. All blocks of the metablock are erased together, and pages from each block are preferably programmed and read simultaneously.

There are many different memory array architectures, configurations and specific cell structures that may be employed to implement the memories described above with respect to FIGS. 2-6. One block of a memory array of the NAND type is shown in FIG. 7. A large number of column oriented strings of series connected memory cells are connected between a common source 65 of a voltage $V_{ss}$ and one of bit lines BL0-BLN that are in turn connected with circuits 67 containing address decoders, drivers, read sense amplifiers and the like. Specifically, one such string contains charge storage transistors 70, 71 ... 72 and 74 connected in series between select transistors 77 and 79 at opposite ends of the strings. In this example, each string contains 16 storage transistors but other numbers are possible. Word lines WL0-WL15 extend across one storage transistor of each string and are connected to circuits 81 that contain address decoders and voltage source drivers of the word lines. Voltages on lines 83 and 84 control connection of all the strings in the block together to either the voltage source 65 and/or the bit lines BL0-BLN through their select transistors. Data and addresses come from the memory controller.

Each row of charge storage transistors (memory cells) of the block forms a page that is programmed and read together. An appropriate voltage is applied to the word line (WL) of such a page for programming or reading its data while voltages applied to the remaining word lines are selected to render their respective storage transistors conductive. In the course of programming or reading one row (page) of storage transistors, previously stored charge levels on unselected rows can be disturbed because of voltages applied across all the strings and to their word lines.

Addressing the type of memory described above is schematically illustrated by FIG. 8, wherein a memory cell array 91, drastically simplified for ease of explanation, contains 18 blocks 0-17. The logical block addresses (LBAs) received by the memory system from the host are translated into an equal number of physical block numbers (PBNs) by the controller, this translation being functionally indicated by a block 93. In this example, the logical address space includes 16 blocks, LBAs 0-15, that are mapped into the 18 block physical address space, the 2 additional physical blocks being provided for an erased block pool. The identity of those of the physical blocks currently in the erased block pool is kept by the controller, as indicated by a block 95. In actual systems, the extra physical blocks provided for an erased block pool are less than five percent of the total number of blocks in the system, and more typically less than two or three percent. The memory cell blocks 91 can represent all the blocks in an array or those of a portion of an array such as a plane or a zone, wherein the group of blocks 91 and operation of the group are repeated one or more times. Each of the blocks shown can be the usual block with the smallest number of memory cells that are erasable together or can be a metablock formed of two or more such blocks in two or more respective planes.

Operation of an Example Memory System Without Wear Leveling

In order to illustrate the concentration of use of physical blocks that can result when the data of a small number of logical block addresses are repetitively updated, an example sequence of five consecutive programming operations is described with respect to FIGS. 9A-9F. FIG. 9A shows a starting situation where data with logical addresses LBA 2 and LBA 3 are stored in physical blocks with addresses PBN 6 and PBN 10, respectively. Shaded physical blocks PBN 3 and PBN 9 are erased and form the erased block pool. For this illustration, data at LBA 2 and LBA 3 are repetitively updated, one at a time.

Assume a programming operation where the data at logical address LBA 2 is to be re-written. Of the two blocks 3 and 9 in the erase pool, as shown in FIG. 9B, block 3 is chosen to receive the data. The choice of an erased block from the pool may be random, based upon a sequence of selecting the block that has been in the erase pool the longest, or based upon some other criterion. After data is written into block 3, block 6, which contains the invalid data from LBA 2 that has just been updated, is erased. The logical-to-physical address translation 93 is then updated to show that LBA 2 is now mapped into PBN 3 instead of PBN 6. The erased block pool list is also then updated to remove PBN 3 and add PBN 6.

In a next programming operation illustrated in FIG. 9C, the data of LBA 3 are updated. The new data are written to erased pool block 9 and block 10 with the old data is erased and placed in the erase pool. In FIG. 9D, the data of LBA 2 are again updated, this time being programmed into erase pool block 10, with the former block 3 being added to the erase pool. The data of LBA 3 are again updated in FIG. 9E, this time by writing the new data to erased block 6 and returning block 9 to the erase pool. Lastly, in FIG. 9F of this example, the data of LBA 2 is again updated by writing the new data to the erase pool block 3 and adding block 10 to the erase pool.

What this example sequence of FIGS. 9A-9F clearly shows is that only a few of the 18 blocks 91 are receiving all the activity. Only blocks 3, 6, 9 and 10 are programmed and erased. The remaining 14 blocks have been neither programmed nor erased. Although this example may be somewhat extreme in showing the repetitive updating of data in only two logical block addresses, it does accurately illustrate the problem of uneven wear due to repetitive host rewrites of data in only a small percentage of the logical block addresses. And as the memory becomes larger with more physical blocks, the unevenness of wear can become more pronounced as there are more blocks that potentially have a low level of activity.

Wear Leveling Without Maintaining Block Experience Counts

An example of a process to level out this uneven wear on the physical blocks is given in FIGS. 10A-10F. In FIG. 10A, the state of the blocks shown is after completion of the programming and erasing operations illustrated in FIG. 9B. But before proceeding to the next programming operation, a wear leveling operation is carried out, which is shown in FIG. 10B. In this case, a wear leveling-exchange occurs between physical blocks 0 and 6. Block 0 is involved as a result of being the first block in order of a sequence that scans all the physical blocks of the memory 91, one at a time, in the course of performing wear leveling exchanges. Block 6 is chosen because it is in the erase pool when the exchange is to take place. Block 6 is chosen over block 9, also in the erase pool, on a random basis or because it has been designated for the next write operation. The exchange between blocks 0 and 6 include copying the data from block 0 into block 6 and then erasing block 0, as shown in FIG. 10B. The address translation 93 (FIG. 8) is then updated so that the LBA that was mapped into block 0 is now mapped into block 6. The erased block pool list 95 is also updated to remove block 6 and add block 0. Block 6 is typically removed from the head of the erased block pool list 95 and block 0 added to the end of that list.

Thereafter, a new programming step would normally be carried out, an example being shown in FIG. 10C. Updated data received with the LBA 3 can be written into erase pool block 0, which was not in the erase pool during the corresponding write operation illustrated in FIG. 9C. The intervening wear leveling exchange has changed this. After updated data of LBA 3 is written into block 0, block 10 holding the prior version of the data of LBA 3 is erased and made part of the erase pool. Physical block 0 has been added to those of the erase pool that are being actively utilized in this example, while block 6, actively utilized in the past, now stores data for a LBA that is not being updated so frequently. Physical block 6 is now likely to be able to rest for a while.

Another programming operation is illustrated in FIG. 10D, this time to update the data of LBA 2, which is written into erase pool physical block 9 in this example. Block 3 containing the old data of LBA 2 is then erased and block 3 becomes part of the erase pool.

After the two write operations illustrated in FIGS. 10C and 10D, another wear leveling exchange is made, as shown in FIG. 10E. The next in order block 1 (block 0 was exchanged the last time, FIG. 10B) is exchanged with one of the blocks currently in the erase pool. In this case, block 1 is exchanged with block 3. This involves transferring data from block 1 into the erased block 3, and then erasing block 1. The address translation table 93 (FIG. 8) is then updated to remap the LBA, formerly mapped into block 1, into block 3, and add block 1 to the erase pool list 95. Block 1, with a low level of use, has then been added to the list of blocks likely to be used heavily until later replaced, while the heavily used block 3 will now receive data for an LBA that has been relatively inactive and is likely to remain so for a time.

In a final operation of this example, another programming operation is performed, shown in FIG. 10F. Here, updated data of LBA 3 is written into the erase block 10 and block 0 becomes part of the erase pool.

It can be seen, as a result of the two wear leveling exchanges in this example, that two heavily used blocks have been removed from the sequence of being cycled to the erase pool, being written with new data, again being moved to the erase pool, and again being written with new data, and so on. In their place, two blocks with low usage (no usage in this example) replace them in this potential heavy use cycle. The result, as further wear leveling exchanges occur in sequence with blocks 2, 3, 4 etc. in order, is that all the blocks of the memory 91 more evenly share the duty of being erase pool blocks. The designated erase pool blocks are moved throughout the entire memory space.

In this example, a wear leveling exchange has been caused to occur once every two programming cycles, in order to explain the concepts involved. But in actual implementations, this may be made to occur at intervals of 50, 100, 200 or more instances of programming data into an erase block. Any other data programming operations that do not use a block from the erase pool, such as when data are written into one or a few pages of a block not in the erase pool, can be omitted from the count since they do not contribute directly to the uneven wear that is sought to be remedied. Since the wear leveling process adds some overhead to the operation of the memory system, it is desirable to limit its frequency to that necessary to accomplish the desired wear leveling. The interval at which a wear leveling exchange takes place can also be dynamically varied in response to patterns of host data updates, which host patterns can be monitored. Further, some other parameter of operation of the memory system other than the number of programming operations may be used instead to trigger the wear leveling exchange.

The wear leveling process illustrated in the example of FIGS. 10A-10F increments a relocation pointer through the physical blocks in order to identify each new candidate for a wear leveling exchange, to take place when the other criterion is met. This pointer need not, of course, follow this particular order but can be some other order. Alternatively, the block to be pointed to can be determined by a random or pseudorandom number generator of physical block numbers. In addition, although the example herein shows one block being exchanged at a time, two or more blocks can be exchanged at a time, depending upon the size of the memory, the number of blocks, proportional number of erased pool blocks, and the like. In any case, a block that has been pointed to will not usually be exchanged if, at the time the other criterion is met for an exchange to occur, the block is either erased or subject to a pending programming operation by the controller.

As an alternative to using the physical block address for selecting the source block, according to a sequential progression or otherwise, the logical address of a block of data may be used instead. This makes no real difference of the effectiveness of the wear leveling, but it has some implementation advantages.

It may be noted that these relocations of data also have the effect of refreshing the data. That is, if the threshold levels of some of the memory cells have drifted from their optimum levels for their programmed states by disturbing operations on neighboring cells, rewriting the data into another block restores the threshold levels to their optimum levels before they have drifted so far as to cause read errors. But if some threshold levels of data in a block have drifted that far before the wear leveling exchange, the controller can perform an error correction operation on the read data to correct a limited number of errors within the capability of such error correction before the data are rewritten into the erase pool block.

Wear Leveling Supplemented by the Use of Block Experience Counts

A principal advantage of the wear leveling process described above with respect to FIGS. 8-10 is that it does not require the maintenance of individual block or block group erase cycle experience counts as do other wear leveling algorithms. But experience counts can enhance the wear leveling process described. Particularly if such experience counts are present in the system anyway to serve another purpose, it may be beneficial to the performance of the system to use them as part of the wear leveling process. Primarily, such counts may be used to supplement the algorithm described above to reduce the number or frequency of wear leveling exchanges that would otherwise take place.

A system capable of maintaining individual block physical and/or logical experience counts is illustrated in FIGS. 11-13. Referring first to FIG. 11, operation of the controller 19 (FIG. 1A) to program data into flash memory is illustrated in a manner similar to that of FIG. 8 but is different in that hot counts of a number of data rewrites for individual logical blocks and hot counts of a number of erasures for individual physical blocks of the memory cell array are maintained and utilized. A logical-to-physical address translation function 121 converts logical block addresses (LBAs) from a host memory space 125 with which the memory system is connected to physical block addresses (PBAs) of a memory cell array 127 in which data are programmed. A list 123 is maintained of those of the physical blocks 127 that are in an erased state and available to be programmed with data. A list 129 includes the number of erase cycles experienced by each of most or all of the blocks 127, the physical block hot counts. The list 129 is updated each time a block is erased. Another list 131 contains two sets of data for the logical blocks, indications of the number of times that the logical blocks of data have been updated (logical hot counts) and indications such as time stamps that record the last time that data of the individual logical sectors were updated. The data of the lists 123, 129 and 131 may be kept in tables within the controller but more commonly are stored in the non-volatile flash memory in sector or block headers or separate blocks used to record overhead data. The controller 19 then builds tables or portions of tables as necessary from this non-volatile data and stores them in its volatile memory 25 (FIG. 1A).

The host address space 125 is illustrated in FIG. 11 to contain logical blocks LBA 0-LBA N, each logical block including a number of logical sectors outlined by dashed lines, such as a sector 133 within LBA 0. The physical memory 127 is shown to include a number of memory cell blocks PBN 0-PBN (N+2). In this example, there are two more physical blocks than there are logical blocks to provide an erased block pool containing at least two blocks. At any one time, there can be more than two erased blocks of the memory 127 that form the erased block pool, their PBNs being stored in the list 123. The amount of data stored in each physical block PBN is the same as that of each host logical block LBA. In this example, the individual physical blocks store two sectors of data in each page of the block, such a page 135 being shown in the block PBN 0. The memory cell array 127 can be implemented in multiple sub-arrays (planes) and/or defined zones with or without the use of metablocks but is illustrated in FIG. 11 as a single unit for ease in explanation. The wear leveling principles being described herein can be implemented in all such types of memory arrays.

A specific example of the fields included in individual data sectors as programmed into the memory 127 is given in FIG. 12. Data 137, typically but not necessarily 512 bytes, occupies most of the sector. Such data is most commonly user data stored from outside of the memory system, such as data of documents, photographs, audio files and the like. But some data sectors and physical blocks are commonly used in a memory system to store parameters and various operating information referenced by the controller when executing its assigned tasks, some of which are programmed from outside the memory system and others of which are generated by the controller within the memory system.

In addition to the data 137, overhead data, typically but not necessarily 16 bytes total, is also stored as part of each sector. In the example of FIG. 12, this overhead includes a header 139 and an error correction code (ECC) 141 calculated from the data 137 by the controller as the data are programmed. The header includes fields 143 and 145 that give the logical address for the data sector, each of which will be unique. An experience count 147 provides an indication of a number of instances of reprogramming. If a logical experience count, 147 indicates a number of times that data of the particular sector has been written into the memory. If a physical experience count, 147 indicates a number of times that the page in which the data are written has been erased and re-programmed.

A time stamp 149 may also be included in the overhead data to provide an indication of how long it has been since the particular data sector has been rewritten into the memory. This can be in the form of a value of a running clock at the time of the last programming of the sector, which value can then be compared to the current clock time to obtain the time since the sector was last programmed. Alternatively, the time stamp 149 can be a value of a global counter of the number of data sectors programmed at the time the data sector was last programmed. Again, the relative time of the last programming is obtained by reading and comparing this number with the current value of such a global counter. One or more flags 151 may also be included in the header. Finally, an ECC 153 calculated from the header is also usually included.

FIG. 13 shows one sector of data stored in the memory that includes the experience count indications of many physical blocks. A field 163 stores the indication for block PBN 0, a field 165 for block PBN 1, and so on. An ECC 167 calculated from all the hot count fields is also included, as is some form of a header 169 that can contain the same fields as the header 139 of FIG. 12 but not necessarily. Such an overhead sector is likely stored in a block containing a number of other such sectors. Alternatively, the individual block hot counts can be stored in the blocks to which they pertain, such as the overhead data field 147 of FIG. 12 in one sector of the block, or elsewhere within the individual blocks, to provide a single experience count per block.

One example of a beneficial use of experience counts is in the selection of a block or blocks to be exchanged. Instead of stepping through each of the blocks individually in a preset order, groups of a number of blocks each, physically contiguous or otherwise, are considered at a time. The number of blocks in each group is in excess of the one or more blocks that can be selected for the wear leveling exchange. The experience counts of each group of blocks are read and one or more of the blocks with the lowest counts of the group are selected for the exchange. The remaining blocks are not exchanged. This technique allows the wear leveling to be more effective by targeting certain blocks, and thus allows the exchanges to be made less frequently. This reduces the amount of overhead added to the memory system operation by the wear leveling.

Another way to omit unnecessary wear leveling exchanges involves selecting the erase pool block(s) as discussed above, not using experience counts, but then compare the count of the selected block(s) with an average of the experience counts of the blocks of some large portion or all of the memory that use the particular erase pool. Unless this comparison shows the selected erased block to have a count in excess of a preset number over the average, a scheduled erase exchange does not take place. When this difference is small, there is no imbalance in wear of the various involved blocks that needs correcting. The preset number may be changed over the life of the card in order to increase the frequency of the wear leveling operations as the cumulative use of the card increases.

Counts of the number of times data are programmed into the LBAs of the system, either individually or by groups of LBAs, can be maintained in place of, or in addition to, maintaining physical block experience counts. If such logical experience counts are available, they can also be used to optimize the erase algorithm. When the count for a particular LBA is low, for example, it can be assumed that the physical block into which this LBA is mapped will, at least in the near future, receive little wear. A scheduled wear leveling exchange with an erase pool block can be omitted when the LBA count for the data stored in the physical block selected in the step 101 is higher than an average by some preset amount. A purpose of the wear leveling algorithm illustrated in FIG. 10 is to cycle blocks that are being used less than average into the erase pool, in order to promote even wear of the blocks. However, the mapping of an LBA with a very high count into a block of the erase pool could work to increase differences of wear instead.

In an example of the use of block experience counts that enhances the process described above, the counts of the blocks in the erase pool may be used to select the one or more destination blocks to take part in the exchange. The erase pool block(s) with the highest count are selected.

Wear Leveling Process Flow Example

An example wear leveling process that may incorporate the various wear leveling features described above is illustrated in the flow chart of FIG. 14. The wear leveling process is integrated with the programming of data. In a first step 171, a block is identified within the pool of erased blocks for use to store the next block of data provided by the host for writing into the flash memory or to participate in a wear leveling data exchange. This is most simply the block that has been in the erase pool the longest, a form of a first-in-first-out (FIFO) sequence. This is preferred when experience counts are not used. Alternatively, when some form of block experience counts are available, the block within the erase pool having the highest experience count may be identified in the step 171.

In a next step 173, parameters relevant to determining whether a wear leveling exchange should take place are monitored, and, in a companion step 175, it is determined whether one or more criteria have been satisfied to initiate wear leveling. One such parameter is the number blocks from the erase pool that have received new data since the last wear leveling exchange, either data written for any reason or only user data provided by the host. This requires some form of counting the overall activity of programming the memory but does not require individual block experience counts to be maintained. A wear leveling exchange may then be determined in the step 175 to take place after each N number of blocks from the erase pool into which data have been written.

Alternatively for steps 173 and 175, if block experience counts are available, the counts of the blocks may be monitored and a wear leveling exchange initiated when the next block made available in the erase pool to receive data, such as in the FIFO order mentioned above, has an experience count that is higher than other blocks, such as higher than an average experience count of all or substantially all other blocks in the system.

It may be desirable that wear leveling exchanges do not take place during the early life of the memory system, when there is little need for such leveling. If a total count of the number of blocks erased and reprogrammed during the life of the memory is available, a wear leveling exchange can be initiated with a frequency that increases as the total usage of the memory system increases. This method is particularly effective if experience counts are used to target the selection of the source block. If the number N of blocks used since the last wear leveling exchange is used as a criterion, that number can be decreased over the life of the memory. This decrease can be a linear function of the total number of block erase or programming cycles experienced by the memory, or some non-linear function including a sharp decrease after the memory has been used for a significant portion of its total life. That is, no wear leveling exchanges take place until the memory has been used a substantial amount, thereby not to adversely impact system performance when there is little to be gained by doing so.

If the criteria are not met in the step 175, a next step 177 causes the system to wait until the host requests that data be written into the memory. When such a request is received, data supplied by the host is written by a step 179 into the erase pool block identified by the step 171 above. In a next step 181, a block with data that has become obsolete as a result of the host write is erased. Data in one block are rendered obsolete when the host causes new data to be written into another block that updates and replaces the data in the one block. If the host causes data to be written that do not update or replace existing data stored in the memory, step 181 is skipped.

After writing the new data and erasing any obsolete data, as indicated by a step 183, the address translation table (table 93 of FIG. 8; table 121 of FIG. 11) and the erased block pool list (list 95 of FIG. 8; list 123 of FIG. 11) are updated. That is, the physical address of the block in which data obtained from the host have been written is recorded in the translation table to correspond with the logical address of the data received from the host. Also, if a block is erased in the process, the address of that block is added to the erased block pool list so that it may be reused in the future to store host data. After the table and list have been updated, the processing returns to the step 171 to identify another erase pool block for use.

Returning to the decision step 175, if the criteria have been met to initiate a wear leveling operation, a next step 185 determines whether there is a wear leveling data transfer from one or more blocks to one or more other blocks that is currently in process. This can occur if the wear leveling operation transfers only a portion of the data involved at one time. Such partial data copy is generally preferred since it does not preclude other operations of the memory, such as data programming, for the longer period that is required to copy an entire block of data without interruption. By transferring the data in parts, the memory may execute other operations in between the transfers. This is what is shown in FIG. 14. Data from one block may be transferred at a time, in the case of multiple block data transfers, or, in the case of a single block data transfer, data from only a few of its pages may be transferred at a time.

Alternatively, all of the data from the source block may be transferred into the destination erased pool block as part of one operation. This is preferred if the amount of data to be copied is small since the time necessary for the transfer is then also small. The transfer continues without interruption until it is completed. In such a case, the next step after step 175 is a first step 187 of selecting one or more blocks for a wear leveling transfer. This is because there will be no partially completed data transfer that needs to be resumed.

In the case where a copying operation is in progress, a next step 189 causes the specified portion of the data to be transferred to be copied from the previously identified source block(s) to the erase pool destination block(s). A break is then taken to inquire, at a step 191, whether the host has a data write operation pending. This is the same decision that is made in the step 177. If the host does want to have data written into the memory, the processing proceeds to the step 179, where it is done. But if there is not host write command pending, a next step 193 determines whether the data copying of the pending wear leveling operation is now complete. If it is not, the processing returns to the step 189 to continue the data copying until complete. When the copying is complete, the source block(s) from which the data was copied are erased, as indicated by the step 195. The step 183 is then next, where the translation table and erased block pool list are updated.

Back at the step 185, if there is no data copying in progress, a source block of data to be transferred is next identified, in a series of steps 187-205. In the step 187, a first candidate block is selected for review. As previously described, this most simply involves selecting the one block next in order without the need for knowing the relative experience counts of the blocks. A pointer can be caused to move through the blocks in a designated order, such as in the order of the addresses of the physical blocks. Alternatively, a next block for a wear leveling operation may be selected by use of a random or pseudo-random address generator.

If block experience counts are being maintained, however, the candidate source block identified in the step 187 is the first of a group or all of the blocks of an array whose experience counts are to be read. One goal is to always select the block in the entire array that has the smallest experience count; that is, the coldest block. Another alternative is to step through addresses of a designated group of blocks in some predetermined order and then identify the block within a designated group that is the coldest. Although these alternatives are used with physical block experience counts, another alternative is to step through the logical addresses of a group or all the blocks to determine that having the coldest logical experience count.

Once a candidate source block has been identified by the step 187 in one of these ways, a next step 197 determines whether the candidate is erased. If so, the step 187 then selects another candidate. If not, a step 199 then determines whether there is a pending host operation to write data to the candidate block. If there is, the processing returns to the step 187 but, if not, proceeds to a step 201 to note the experience count of the block if experience counts are being used.

A next step 203 determines whether all the blocks in the group or array, as designated, have been reviewed by the steps 187-201. If not, a next candidate block is identified by the step 187 and the steps 197-203 repeated with respect to it. If all blocks have been reviewed, a step 205 selects a block or blocks meeting the set criteria, such as the block(s) having the lowest experience count. It is those blocks to which data are copied in a next step 189.

The steps 201, 203 and 205 are utilized when the experience counts or some other parameter are utilized to make the block selection from a group of blocks being considered. In the case where no such parameter is used, namely where the source block(s) is selected by proceeding to the next block address in some designated or random order, that single block or blocks are identified in the step 187 by use of the address pointer discussed above. Nothing then happens in the step 201, since block parameters are not being considered, and the decision of the step 203 will always be "yes." The resulting selection in this case is a block(s) selected by the step 187 and which survives the inquires of the steps 197 and 199.

The process illustrated by FIG. 14 integrates data programming and wear leveling operations. The next block of the erase pool identified to receive data (step 171) is used as a destination for either a wear leveling data exchange within the memory system or data from outside the system.

As mentioned above, logical block addresses may be used to select the source block for a wear leveling exchange. When physical blocks are used, a sector in the selected block has to be read to determine the logical address of the data (so that the translation tables can be subsequently updated), to determine if the block contains control data, or to determine if the block is erased. If the block is erased, it is a "selection miss" and the process must be repeated on another block, as per FIG. 14. This method allows blocks with control data, as well as blocks with user data, to be selected for wear leveling.

When logical blocks are used, an address table sector is read to determine the physical block address corresponding to the selected logical block address. This will always result in selection of a block that is not erased, and does not contain control data. This eliminates the selection miss, as above, and can allow steps 197 and 199 of FIG. 14 to be skipped. Wear leveling may be omitted for control data blocks.

The wear leveling process illustrated in FIG. 14 is described, specifically in the step 189, to copy all the data from the selected source blocks to an equal number of erase pool blocks. Alternatively, this designated amount of data may be copied in two or more separate copy operations. If data from multiple blocks are to be copied, for example, data may be copied from one block at a time. Less than one block of data may even be copied each time by copying data from a certain number of pages less than that of a block. The advantage of partial data copying is that the memory system is tied up with each data transfer for less time and therefore allows other memory operations to be executed in between.

If the host tries to access data in the source block(s) before all the data has been transferred and the logical-to-physical address translation table is updated, the current wear leveling operation is abandoned. Since the data remains intact in the source block(s) until these steps are taken, the host has access to the partially transferred data in the source blocks. Such access remains the same as if the wear leveling exchange had not been initiated.

Outline of Wear Leveling Features

The following outline provides a summary of the various features of wear leveling described above.
1. Selection of a block(s) as the source of data for a wear leveling exchange.
   1.1 By a deterministic selection, either the next block in a predetermined sequence of blocks, or a random or pseudo-random selection, without knowing the relative experience counts of the blocks; or 1.2 If physical block experience counts are maintained, select the block of the entire array, plane or sub-array with the lowest experience count; or 1.3 If physical block experience counts are maintained, make a deterministic selection of a group of blocks and then identify the block among the group of blocks that has the lowest experience count; or 1.4 If logical block experience counts are maintained, select the physical block of the entire array, plane or sub-array that holds the block of data with the lowest logical experience count.

2.0 Selection of an erased block(s) as the destination for data in a wear leveling exchange.

2.1 Use a predetermined sequence of the erased pool blocks to select one of them, such as the block that has been in the erase pool the longest, without the need to know the experience counts of the blocks; or 2.2 If block experience counts are maintained, the block in the erase pool having the highest experience count is selected.

3.0 Scheduling of wear leveling exchanges.

3.1 Every N times a block is allocated from the erase pool to receive data, without the need for block experience counts; or 3.2 If block experience counts are maintained, whenever the next block in order for use from the erase pool according to a predetermined sequence has an experience count that is more than an average experience count of all the blocks in the memory system, plane or sub-system.

3.3 The frequency of the initiation of wear leveling exchanges can be made to vary over the life of the memory system, more toward the end of life than at the beginning.

4.0 When experience counts are maintained for the individual blocks or groups of blocks, they may be stored either:

4.1 In the blocks themselves, such as overhead data stored with sectors of user data; or 4.2 In blocks other than those to which the experience counts relate, such as in reserve or control blocks that do not store user data.

5.0 Data copying as part of a wear leveling exchange.

5.1 Data of one or more source blocks are copied in one uninterrupted operation to a corresponding number of one or more destination blocks; or 5.2 A portion of the data to be transferred is copied at a time, thereby to copy the data for one wear leveling exchange in pieces distributed among other memory system operations.

CONCLUSION

Although the various aspects of the present invention have been described with respect to exemplary embodiments thereof, it will be understood that the present invention is entitled to protection within the full scope of the appended claims.

The invention claimed is:

1. A method of operating a system of erasable and re-programmable non-volatile memory cells organized into a plurality of physical blocks of a minimum number of memory cells that are simultaneously erasable and wherein incoming data are programmed into those of the plurality of physical blocks maintained as an erased block pool, comprising:

identifying at least one of the plurality of physical blocks at a time other than those in the erased block pool for a wear leveling exchange, monitoring an operational parameter associated with programming data into those of the plurality of physical blocks maintained as an erased block pool, and in response to the monitored operational parameter reaching a preset threshold, exchanging the identified at least one of the plurality of physical blocks with a corresponding number of at least one of the physical blocks within the erased block pool, wherein monitoring the operational parameter includes monitoring a number of one or more times that erased pool blocks have been programmed with data since a previous wear leveling exchange, and wherein said method additionally comprises maintaining within the system indications of an average number of erase cycles individually experienced by the plurality of physical blocks, and wherein said exchanging occurs when a number of erase cycles experienced by the erased pool blocks exceeds said average number of erase cycles experienced by the plurality of physical blocks by a preset difference, wherein said preset difference is a positive number or zero.

* * * * *